United States Patent Office 2,882,274
Patented Apr. 14, 1959

2,882,274

AMINO ETHERS

Robert Michel Jacob, Ablon-sur-Seine, and Raymond Jacques Horclois, Malakoff, France, assignors to Societe des Usines Chimiques Rhone-Poulenc, Paris, France, a French body corporate No Drawing. Application December 23, 1957
Serial No. 704,302

Claims priority, application France January 4, 1957

4 Claims. (Cl. 260—294.7)

This invention relates to new amino ethers and a process for their preparation.

According to the present invention there are provided new amino ethers conforming to the general formula:

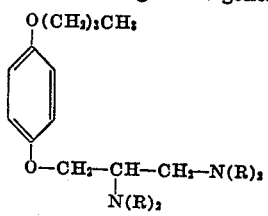

in which the individual groups R are the same or different and, when individual groups, represent alkyl groups containing not more than four carbon atoms or, when pairs are linked together, form with the adjacent nitrogen atom a mono-nuclear heterocyclic ring such as pyrrolidino, piperidino, morpholino, piperazino or 4-alkylpiperazino, and acid addition and quaternary ammonium salts thereof.

According to a feature of the invention the aforesaid new amino ethers are prepared from 1-n-butoxy-4-hydroxybenzene by known methods for the etherification of phenols. By the term "known methods" as used in this specification is meant methods heretofore used or described in the chemical literature.

The preferred method for effecting etherification consists in reacting a diaminohalogenopropane of the formula:

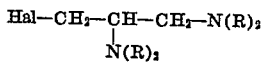

or

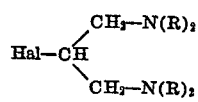

(wherein Hal represents a halogen atom and R is as hereinbefore defined) with an alkali metal derivative of 1-n-butoxy-4-hydroxybenzene. During the course of the reaction an isomerisation of the diaminohalogenopropane of Formula II or III takes place and there is obtained a mixture of two isomers, one isomer conforming to general Formula I and the other to the formula:

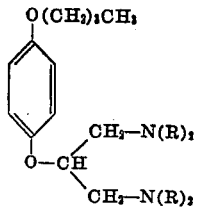

The desired isomer of Formula I is separated from the other by, for example, forming acid addition salts of the isomers and fractionally crystallising the acid addition salts from a suitable solvent.

The new amino ethers of the present invention are interesting local anaesthetics; they are of low toxicity and are particularly well tolerated. They may be employed as local anaesthetics in the form of acid addition salts containing pharmaceutically acceptable anions (such as hydrochlorides and other hydrohalides, phosphates, nitrates, sulphates, maleates, fumarates, citrates, tartrates, oxalates, methanesulphonates and ethanedisulphonates) or of quaternary ammonium salts obtained by reaction with organic halides (e.g. methyl or ethyl iodide, chloride or bromide or allyl or benzyl chloride or bromide) or other reactive esters.

The following examples illustrate the invention; the melting points indicated were determined on the Kofler bench.

Example I

Sodium ethylate is prepared by dissolving sodium (2.3 g.) in ethanol (250 cc.). 1-n-butoxy-4-hydroxybenzene (16.6 g.) is then added at 40° C. The solution is allowed to cool and 1:3-bis-dimethylamino-2-chloropropane (18.1 g.) is added. The mixture is heated under reflux for 1 hour, the product filtered, concentrated in vacuo and ether (150 cc.) and N sodium hydroxide (50 cc.) then added. After agitation and decanting, the ethereal layer is recovered. This is shaken with 10% hydrochloric acid (60 cc.) and the aqueous acid layer decanted. The free base is liberated with sodium hydroxide ($d=1.33$, 25 cc.) and extracted with ether (100 cc.). The ethereal layer is washed with water, dried over sodium sulphate and concentrated in vacuo.

A mixture (23.5 g.) of 1-n-butoxy-4-(2:3-bis-dimethylaminopropoxy)-benzene and 1-n-butoxy-4-(1:3-bis-dimethylamino-2-propoxy)benzene is obtained. Purification is carried out by preparing the acid dioxalate, M.P. 128° C. and then the dimaleate, M.P. 72° C. The base is recovered and 1-n-butoxy-4-(2:3-bis-dimethylaminopropoxy)benzene (8.2 g.) is obtained.

Example II

Proceeding as in Example I but commencing with 1-n-butoxy-4-hydroxybenzene (16.6 g.) and 1:3-dipiperidino-2-chloropropane (26.8 g.), a mixture (35.5 g.) is obtained of 1-n-butoxy-4-(2:3-dipiperidinopropoxy)benzene and 1-n-butoxy-4-(1:3-dipiperidino-2-propoxy)benzene. Purification is carried out by preparing the dipicrate which is recrystallised from methanol. The picrate melts originally at 155° C., resolidifies and then melts at 176° C. The base is recovered with lithium hydroxide and extracted with ether. 1-n-butoxy-4-(2:3-dipiperidinopropoxy)benzene (6.3 g.) is obtained.

We claim:

1. A member of the class consisting of an amino ether confronting to the general formula:

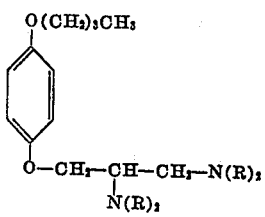

its non-toxic acid addition salts and its quaternary ammonium derivatives formed with a ester selected from the class consisting of methyl and ethyl iodide, chloride and bromide, and alkyl and benzyl chloride and bromide, in which the groups R, when individual groups, are each an alkyl group containing up to four carbon atoms and, when pairs are linked together, form with the nitrogen atom to which they are attached a mononuclear heterocyclic ring selected from the class consisting of pyrrolidino, piperidino, morpholino, piperazino and 4-alkylpiperazino rings.

2. 1-n-butoxy-4-(2:3-bis-dimethylaminopropoxy)benzene.

3. 1-n-butoxy-4-(2:3-dipiperidinopropoxy)benzene.

4. A process for the preparation of an amino ether which comprises heating an alkali metal derivative of 1-n-butoxy-4-hydroxybenzene with a diaminohalogenopropane of one of the formulae:

$$Hal-CH_2-CH(N(R)_2)-CH_2-N(R)_2$$

and $$Hal-CH(CH_2-N(R)_2)(CH_2-N(R)_2)$$

in which Hal represents a halogen atom and the groups R, when individual groups, are each an alkyl group containing up to four carbon atoms and, when pairs are linked together, form with the nitrogen atom to which they are attached a mononuclear heterocyclic ring selected from the class consisting of pyrrolidino, piperidino, morpholino, piperazino and 4-alkylpiperazino rings, and separating by fractional crystallisation from the reaction mixture an amino ether of the formula:

No references cited.